US011040332B2

(12) United States Patent
Ohtake et al.

(10) Patent No.: US 11,040,332 B2
(45) Date of Patent: Jun. 22, 2021

(54) COMPLEX OXIDE, METHOD FOR PRODUCING SAME, AND EXHAUST GAS PURIFICATION CATALYST

(75) Inventors: Naotaka Ohtake, Tokushima (JP); Keiichiro Mitsuoka, Tokushima (JP); Kazuhiko Yokota, Shanghai (CN)

(73) Assignee: RHODIA OPERATIONS, Aubervilliers (FR)

( * ) Notice: Subject to any disclaimer, the term of this patent is extended or adjusted under 35 U.S.C. 154(b) by 0 days.

(21) Appl. No.: 14/119,264

(22) PCT Filed: May 28, 2012

(86) PCT No.: PCT/JP2012/063586
§ 371 (c)(1),
(2), (4) Date: Jan. 7, 2014

(87) PCT Pub. No.: WO2012/165362
PCT Pub. Date: Dec. 6, 2012

(65) Prior Publication Data
US 2014/0179515 A1 Jun. 26, 2014

(30) Foreign Application Priority Data

Jun. 1, 2011 (JP) .............................. JP2011-123010

(51) Int. Cl.
| | | |
|---|---|---|
| *B01J 21/00* | (2006.01) | |
| *B01J 23/10* | (2006.01) | |
| *B01D 53/94* | (2006.01) | |
| *B01J 35/10* | (2006.01) | |
| *B01J 37/02* | (2006.01) | |
| *B01J 37/03* | (2006.01) | |
| *B01J 21/08* | (2006.01) | |
| *C01F 17/32* | (2020.01) | |
| *B01J 23/00* | (2006.01) | |
| *B01J 25/00* | (2006.01) | |
| *B01J 29/00* | (2006.01) | |
| *F01N 3/10* | (2006.01) | |

(52) U.S. Cl.
CPC .............. *B01J 23/10* (2013.01); *B01D 53/94* (2013.01); *B01J 21/08* (2013.01); *B01J 35/1004* (2013.01); *B01J 35/1014* (2013.01); *B01J 37/0201* (2013.01); *B01J 37/031* (2013.01); *C01F 17/32* (2020.01); *B01D 53/945* (2013.01); *B01D 2255/2061* (2013.01); *B01D 2255/2063* (2013.01); *B01D 2255/2065* (2013.01); *B01D 2255/2066* (2013.01); *B01D 2255/2068* (2013.01); *B01D 2255/30* (2013.01); *B01D 2255/40* (2013.01); *B01D 2255/908* (2013.01); *B01D 2255/9207* (2013.01); *C01P 2002/50* (2013.01); *C01P 2002/54* (2013.01); *C01P 2006/13* (2013.01); *C01P 2006/90* (2013.01); *F01N 3/10* (2013.01); *Y02T 10/12* (2013.01)

(58) Field of Classification Search
USPC .................... 502/263, 100, 232, 240, 300
See application file for complete search history.

(56) References Cited

U.S. PATENT DOCUMENTS

| | | | |
|---|---|---|---|
| 4,940,685 A | 7/1990 | Sauvion et al. | |
| 5,529,969 A | 6/1996 | Bonneau et al. | |
| 5,750,090 A | 5/1998 | Yoshida et al. | |
| 8,921,255 B2* | 12/2014 | Ohtake | ............... B01J 35/1014 502/263 |
| 2002/0042342 A1 | 4/2002 | Mussmann et al. | |
| 2002/0185151 A1* | 12/2002 | Qingyuan | ............... C03C 15/00 134/1.2 |
| 2006/0052243 A1* | 3/2006 | Muhammed | ............ C01F 17/32 502/304 |

(Continued)

FOREIGN PATENT DOCUMENTS

| | | |
|---|---|---|
| EP | 0547924 A1 | 6/1993 |
| EP | 1180397 A1 | 2/2002 |
| EP | 1872851 A2 | 1/2008 |
| JP | 62-056322 A | 3/1987 |
| JP | 6-210174 A | 8/1994 |
| JP | 9-118610 A | 5/1997 |
| JP | 2010-530343 A | 9/2010 |

OTHER PUBLICATIONS

Rocchini, E., et al—"Relationships between Structural/Morphologoical Modifications and Oxygen Storage-Redox Behavior of Silica-Doped Ceria", 2000, Journal of Catalysis, Academic Press, vol. 194, Issue No. 2, XP027233372, pp. 461-478; 18 pgs.

*Primary Examiner* — James E McDonough

(74) *Attorney, Agent, or Firm* — Osha Bergman Watanabe & Burton LLP

(57) ABSTRACT

Provided are: a complex oxide that exhibits high redox ability even at low temperatures, has excellent heat resistance, and stably retains these characteristics even on repeated oxidation and reduction at high temperature; a method for producing the same; and an exhaust gas purification catalyst. The inventive complex oxide contains more than 0 but no more than 20 parts by mass of Si, calculated as $SiO_2$, per total 100 parts by mass of rare earth metal elements including Ce, calculated as oxides; and has a characteristic such that when it is subjected to temperature-programmed reduction (TPR) measurement in a 10% hydrogen-90% argon atmosphere at from 50° C. to 900° C. with the temperature increasing at a rate of 10° C./min, followed by oxidation treatment at 500° C. for 0.5 hours, and then temperature-programmed reduction measurement is performed again, its calculated reduction rate at and below 400° C. is at least 1.5%.

17 Claims, No Drawings

(56) References Cited

U.S. PATENT DOCUMENTS

| | | |
|---|---|---|
| 2008/0009410 A1 | 1/2008 | Okamoto et al. |
| 2008/0293563 A1* | 11/2008 | Ding ........................ B01J 23/75 |
| | | 502/150 |
| 2010/0329954 A1 | 12/2010 | Yokota et al. |
| 2012/0316059 A1* | 12/2012 | Ohtake ............... H01M 8/1246 |
| | | 502/263 |

* cited by examiner

COMPLEX OXIDE, METHOD FOR PRODUCING SAME, AND EXHAUST GAS PURIFICATION CATALYST

CROSS-REFERENCE TO RELATED APPLICATIONS

This application is a U.S. national stage entry under 35 U.S.C. §371 of International Application No. PCT/JP2012/063586 filed May 28, 2012, which claims priority to Japanese Application No. 2011-123010, filed Jun. 1, 2011. The entire contents of these applications are explicitly incorporated herein by this reference.

TECHNICAL FIELD

The present invention relates to a complex oxide that exhibits high redox ability even at low temperatures, has excellent heat resistance, and can be used in catalysts, functional ceramics, solid electrolytes for fuel cells, and in abrasives and the like, and is particularly suitable for use as an auxiliary catalyst in exhaust gas purification catalysts for automobiles and the like; the present invention also relates to a method for producing the same; and to an exhaust gas purification catalyst that utilizes said complex oxide.

BACKGROUND TECHNOLOGY

In the construction of exhaust gas purification catalysts for automobiles and the like, platinum, palladium or rhodium, which are catalytic metals, plus auxiliary catalyst that increases the catalytic effect thereof, are supported on a catalyst support such as alumina, cordierite or the like, for example. A characteristic of said auxiliary catalyst material is that it absorbs oxygen in an oxidizing atmosphere and releases oxygen in a reducing atmosphere. Auxiliary catalyst materials having such a characteristic efficiently purify harmful components in exhaust gas, namely hydrocarbons, carbon monoxide and nitrogen oxides, and are therefore used to maintain an optimum air/fuel ratio.

The efficiency of exhaust gas purification by exhaust gas purification catalyst is usually proportional to the area of contact between the catalyst metal active species and the exhaust gas. Maintaining said optimum air/fuel ratio is also important, and so a high reduction rate must be maintained for the auxiliary catalyst oxygen absorption/release. Specifically, the tightening of exhaust gas regulations brings demand for an auxiliary catalyst material that has high heat resistance and, at the same time, exhibits high redox ability even when the catalyst temperature is low, as when starting a cold engine, for example.

Several complex oxides that exhibit redox ability at and below 400° C. have already been proposed. For example, patent document 1 proposes a CeZrBi complex oxide that exhibits high redox ability at and below 300° C. However, when this complex oxide is exposed to reducing conditions at or above 700° C., the bismuth oxide is reduced to metallic bismuth, and vaporizes, and so on repeated oxidation and reduction, the bismuth component in the complex oxide is depleted and the redox characteristic deteriorates. Practical use in automobile catalysts, which undergo repeated redox at high temperature over long periods, is therefore difficult. Patent documents 2-4 propose complex oxides comprising CeZrBi plus Ba, Ag or Pt, respectively, where the fourth component is added to improve heat resistance or phase stability. However, on exposure to a reducing atmosphere at high temperature, vaporization of the bismuth component is cause for concern.

Patent documents 5-8 and the like propose the addition of a rare earth metal element or silicon as stabilizer, in order to improve the heat resistance etc., of cerium oxide. Proposed in these documents are various complex oxides with excellent heat resistance at high temperatures, and excellent specific surface area maintenance, according to the BET method.

Nevertheless, specifically, there is no known complex oxide containing cerium, silicon and rare earth metal elements other than cerium that exhibits excellent heat resistance and adequate reduction rate even at low temperature.

PRIOR ART DOCUMENTS

Patent Documents

Patent document 1: Japanese unexamined patent 2003-238159
Patent document 2: International publication 2005/85137
Patent document 3: Japanese unexamined patent 2005-281021
Patent document 4: Japanese unexamined patent 2010-260023
Patent document 5: International publication 2008/156219
Patent document 6: Japanese unexamined patent H4-214026 (1992)
Patent document 7: Japanese unexamined patent 2000-72437
Patent document 8: Japanese unexamined patent H5-270824 (1993)

SUMMARY OF THE INVENTION

Problem to be Solved by the Invention

The problem addressed by the present invention is the provision of a complex oxide that exhibits high redox ability even at low temperatures, has excellent heat resistance, and stably retains these characteristics even on repeated oxidation and reduction at high temperature, and which is particularly suitable as an auxiliary catalyst for exhaust gas purification catalysts; and the provision of an exhaust gas purification catalyst that utilizes the same.

Another problem addressed by the present invention is the provision of a complex oxide production method whereby said inventive complex oxide of excellent heat resistance and reduction rate can easily be obtained.

Means of Solving the Problem

The present invention provides a complex oxide containing more than 0 parts by mass but no more than 20 parts by mass of silicon, calculated as $SiO_2$, per total 100 parts by mass of rare earth metal elements including cerium, calculated as oxides; having a characteristic such that when it is subjected to temperature-programmed reduction (TPR) measurement in a 10% hydrogen-90% argon atmosphere at from 50° C. to 900° C. with the temperature increasing at a rate of 10° C./min, followed by oxidation treatment at 500° C. for 0.5 hours, and then temperature-programmed reduction measurement is performed again, its calculated reduction rate at and below 400° C. is at least 1.5% (hereafter abbreviated to the inventive complex oxide).

Also, the present invention provides a method for producing complex oxide, comprising: step (a1), where cerium solution in which at least 90 mol % of the cerium ions are tetravalent is prepared; step (b1), where the cerium solution prepared in step (a1) is heated to and maintained at no lower than 60° C.; step (c1), where precipitate is obtained by adding precipitant to the cerium suspension obtained by maintained heating; step (d1), where the precipitate is calcined to obtain cerium oxide; step (e1), where the cerium oxide obtained by calcination is impregnated with silicon oxide precursor solution; step (f1), where the cerium oxide impregnated with silicon oxide precursor solution is fired; step (g), where the resulting fired substance is reduced; and step (h), where the reduced substance is oxidized (hereafter abbreviated to method 1). The present invention also provides a method for producing complex oxide, comprising: abovementioned step (a1); abovementioned step (b1); step (a2), where precursor of oxide of rare earth metal element other than cerium, including yttrium, is added to the cerium suspension obtained by maintained heating; step (b2), where cerium suspension containing precursor of oxide of rare earth metal element other than cerium, including yttrium, is heated to and maintained at no lower than 100° C.; step (c2), where precipitate is obtained by adding precipitant to the suspension obtained in step (b2); step (d2), where the precipitate is calcined; step (e2), where the oxide obtained by calcination is impregnated with silicon oxide precursor solution; step (f2), where the oxide impregnated with silicon oxide precursor solution is fired; abovementioned step (g); and abovementioned step (h) (hereafter abbreviated to method 2).

The present invention also provides a method for producing complex oxide, comprising: step (A1), where cerium solution in which at least 90 mol % of the cerium ions are tetravalent is prepared; step (B1), where the cerium solution prepared in step (A1) is heated to and maintained at no lower than 60° C.; step (C1), where silicon oxide precursor is added to the cerium suspension subjected to maintained heating; step (D1), where the cerium suspension containing silicon oxide precursor is heated to and maintained at no lower than 100° C.; step (E1), where precipitate is obtained by adding precipitant to the cerium suspension containing silicon oxide precursor obtained by maintained heating; step (F), where the resulting precipitate is fired; step (G), where the resulting fired substance is reduced; and step (H), where the reduced substance is oxidized (hereafter abbreviated to method 3).

Also, the present invention provides a method for producing complex oxide, comprising: abovementioned step (A1); abovementioned step (B1); step (A2), where silicon oxide precursor and precursor of oxide of rare earth metal element other than cerium, including yttrium, are added to the cerium suspension obtained by maintained heating; step (B2), where the cerium suspension containing silicon oxide precursor and precursor of oxide of rare earth metal element other than cerium, including yttrium, is heated to and maintained at no lower than 100° C.; step (E2), where precipitate is obtained by adding precipitant to the suspension obtained in step (B2); abovementioned step (F); abovementioned step (G); and abovementioned step (H) (hereafter abbreviated to method 4; methods 1-4 are also referred to as the inventive production method).

The present invention also provides an exhaust gas purification catalyst that comprises said inventive complex oxide. Also, the present invention provides the use of said inventive complex oxide to produce an exhaust gas purification catalyst.

The present invention also provides an exhaust gas purification catalyst provided with catalytic metal, auxiliary catalyst comprising the inventive complex oxide, and a catalyst support; where said catalytic metal and auxiliary catalyst are supported on the catalyst support.

Advantages of the Invention

The inventive complex oxide contains silicon, cerium, and, if necessary, rare earth metal element other than cerium, including yttrium (hereafter referred to as specified rare earth metal element), in specific proportions; it exhibits an excellent reducing property even at low temperatures, namely at and below 400° C., and retains excellent heat resistance, and so it is particularly useful as an auxiliary catalyst for exhaust gas purification catalysts.

The inventive complex oxide production method comprises the abovementioned steps; specifically, the oxidation and reduction steps are performed after firing and so said inventive complex oxide can easily be obtained. It is thought that such a complex oxide is obtained because Si-rich domains—in which $CeO_2$ and $SiO_2$ are mixed more uniformly at the nanometer level—form on the surface of the cerium particles in the reduction step and oxidation step in the inventive production method. Thus the inventive complex oxide is thought to have lower activation energy for the formation of cerium silicate when exposed to a reducing atmosphere, and to afford high oxygen release even at and below 400° C. Also, the uniform mixing of $CeO_2$ and $SiO_2$ at the nanometer level and the formation of cerium silicate are thought to occur reversibly even on repeated oxidation and reduction, and so high redox ability is retained even at and below 400° C.

MODE OF EMBODIMENT OF THE INVENTION

The present invention is described in more detail below. The inventive complex oxide has a characteristic such that when it is subjected to temperature-programmed reduction (TPR) measurement in a 10% hydrogen-90% argon atmosphere at from 50° C. to 900° C. with the temperature increasing at a rate of 10° C./min, followed by oxidation treatment at 500° C. for 0.5 hours, and then temperature-programmed reduction measurement is performed again, its calculated reduction rate at and below 400° C. is at least 1.5%, preferably at least 2.0%. There is no particular upper limit for said reduction rate at and below 400° C., and it is usually 4.0%, preferably 5.0%.

The reduction rate is the proportion of cerium in the oxide that is reduced from tetravalent to trivalent, calculated from temperature-programmed reduction (TPR) measurement from 50° C. to 900° C.

Said TPR measurements are obtained using an automatic temperature-programmed desorption analyzer (TP-5000) manufactured by (K.K.) Okura Riken, under the following measurement conditions: carrier gas: 90% argon-10% hydrogen; gas flow rate: 30 mL/min; rate of sample temperature increase during measurements: 10° C./min; sample weight 0.5 g.

The calculations are performed according to the equation below.

Reduction rate (%)=measured hydrogen consumption of sample at and below 400° C. (μmol/g)/theoretical hydrogen consumption of cerium oxide in sample (μmol/g)×100

The inventive complex oxide preferably has a heat resistance characteristic such that after said temperature-programmed reduction measurement and oxidation treatment has been repeated three times, the specific surface area according to the BET method is preferably at least 20 m$^2$/g, particularly preferably at least 25 m$^2$/g. There is no particular upper limit for said specific surface area, and it is usually 40 m$^2$/g, preferably 50 m$^2$/g.

Here, specific surface area means the value measured according to the BET method, which is a method for measuring the specific surface area of a powder based on the most typical nitrogen gas adsorption.

The inventive complex oxide exhibits the abovementioned physical properties, and contains more than 0 parts by mass but no more than 20 parts by mass, preferably 1-20 parts by mass, particularly preferably 2-20 parts by mass, and most preferably 5-20 parts by mass, of silicon calculated as SiO$_2$, per total 100 parts by mass of rare earth metal elements including cerium, calculated as oxides. If it contains no silicon, a sufficient reduction rate cannot be achieved; if it contains more than 20% by mass, there is a risk of decrease in heat resistance.

The rare earth metal element including cerium can comprise cerium alone, or cerium plus specified rare earth metal element. The proportion of said cerium to specified rare earth metal element is such that the mass ratio is 85:15-99:1, preferably 85:15-95:5, calculated as oxides. If the proportion of cerium, calculated as CeO$_2$, is less than 85% by mass, or over 99% by mass, there is a risk of decrease in heat resistance and reduction rate.

Examples of said specified rare earth metal elements are yttrium, lanthanum, praseodymium, neodymium, samarium, europium, gadolinium, terbium, dysprosium, holmium, erbium, thulium, ytterbium, lutetium, and mixtures of two or more of these; the use of yttrium, lanthanum, praseodymium, neodymium, and mixtures of two or more of these, is particularly preferred.

In the present invention, yttrium is calculated as its oxide Y$_2$O$_3$, lanthanum is calculated as La$_2$O$_3$, cerium as CeO$_2$, praseodymium as Pr$_6$O$_{11}$, neodymium as Nd$_2$O$_3$, samarium as Sm$_2$O$_3$, europium as Eu$_2$O$_3$, gadolinium as Gd$_2$O$_3$, terbium as Tb$_4$O$_7$, dysprosium as Dy$_2$O$_3$, holmium as Ho$_2$O$_3$, erbium as Er$_2$O$_3$, thulium as Tm$_2$O$_3$, ytterbium as Yb$_2$O$_3$, and lutetium as Lu$_2$O$_3$.

The inventive production method is a method whereby silicon-containing cerium complex oxides including the inventive complex oxide can be obtained easily and with good reproducibility; method 1 includes step (a1), where cerium solution in which at least 90 mol % of the cerium ions are tetravalent is prepared.

Ceric nitrate and ceric ammonium nitrate are examples of water-soluble cerium compounds that can be used in step (a1); use of ceric nitrate solution is particularly preferred.

In step (a1), the initial concentration of the cerium solution in which at least 90 mol % of the cerium ions are tetravalent can usually be adjusted to 5-100 g/L, preferably 5-80 g/L, and particularly preferably 10-70 g/L of cerium, calculated as CeO$_2$. To adjust the concentration of the cerium solution, water is usually used, and deionized water is particularly preferred. If said initial concentration is too high, the precipitate (described later) is not crystalline, there is insufficient pore formation to allow impregnation of the silicon oxide precursor solution (described later), and there is a risk of decrease in the heat resistance and reduction rate of the complex oxide finally obtained. If the concentration is too low, productivity decreases, which is industrially disadvantageous.

In method 1, the cerium solution prepared in step (a1) is then subjected to step (b1), where it is heated to and maintained at no lower than 60° C., to allow the cerium solution to react. The reaction vessel used in step (b1) may be a sealed container or open container. It is preferable to use an autoclave reaction vessel.

The temperature of the maintained heating in step (b1) is no lower than 60° C., preferably 60-200° C., particularly preferably 80-180° C., and more preferably 90-160° C. The maintained heating time is usually 10 minutes-48 hours, preferably 30 minutes-36 hours, more preferably 1 hour-24 hours. If there is insufficient maintained heating, the precipitate (described later) is not crystalline, pores with sufficient volume to allow impregnation of the silicon oxide precursor solution (described later) cannot form, and there is a risk that it will not be possible to sufficiently improve the heat resistance and reduction rate of the complex oxide finally obtained. Too long a maintained heating time has little effect on the heat resistance or reduction rate, and is not industrially advantageous.

Method 1 includes step (c1), where precipitate is obtained by adding precipitant to the cerium suspension obtained as a result of the maintained heating in step (b1).

Sodium hydroxide, potassium hydroxide, ammonia water, ammonia gas, and bases that are mixtures thereof are examples of precipitants that can be used in step (e1); use of ammonia water is particularly preferred.

Said precipitant can be added, for example, by preparing the precipitant as an aqueous solution of suitable concentration, and adding said solution, with agitation, to the cerium suspension obtained in step (b1); ammonia gas can be introduced by blowing it into the reaction vessel with agitation. The amount of precipitant to add can easily be determined by monitoring the variation in the pH of the suspension. It is usually sufficient to add an amount that produces precipitate of cerium suspension of around pH 7-9, preferably pH 7-8.5.

Step (c1) may be performed after the cerium suspension obtained as a result of the maintained heating in step (b1) has cooled.

The cooling is usually performed with agitation, and a commonly known method can be used. Natural slow cooling or forced cooling using a condenser may be employed. The cooling temperature is usually no higher than 40° C., and is preferably room temperature of around 20-30° C.

The precipitation reaction in step (c1) yields a slurry containing cerium oxide hydrate precipitate in which there is advanced crystal growth. Said precipitate can be separated by the Nutsche method, centrifugal separation method, or filter press method, for example. The precipitate can also be rinsed with water if necessary. Also, a step whereby the resulting precipitate is appropriately dried may be included, in order to increase the efficiency of the next step, step (d1).

Method 1 includes step (d1), where the abovementioned precipitate is calcined to obtain cerium oxide. The calcination temperature is usually 250-500° C., preferably 280-450° C.

The cerium oxide obtained by calcination in step (d1) is a porous body that retains pores of sufficient volume to allow impregnation with silicon oxide precursor solution, described below; this step facilitates impregnation with silicon oxide precursor solution, and improves the heat resistance and reduction rate of the final complex oxide.

The calcination time is usually 30 minutes-36 hours, particularly preferably 1-24 hours, and more preferably 3-20 hours.

Method 1 includes step (e1), where the cerium oxide obtained by abovementioned calcination is impregnated with silicon oxide precursor solution. The silicon oxide precursor used in step (e1) is a compound that yields silicon oxide as a result of oxidation treatment such as firing; it should be a compound that allows impregnation of the calcined cerium oxide porous body using solution, and examples include silicates such as sodium silicate, silane compounds such as tetraethyl orthosilicate, silyl compounds such as trimethylsilyl isocyanate, and silicic acid quaternary ammonium salts such as tetramethylammonium silicate.

Solvents for dissolving silicon oxide precursors can be classified according to the type of precursor used. Examples include water, and organic solvents such as alcohol, xylene, hexane and toluene.

There are no particular limitations on the concentration of the silicon oxide precursor solution, provided that the solution can impregnate cerium oxide; for workability and efficiency, the silicon oxide precursor concentration, calculated as $SiO_2$, is usually 1-300 g/L, preferably around 10-200 g/L.

In step (e1), the amount of said silicon oxide precursor added is usually more than 0 parts by mass but no more than 20 parts by mass, preferably 1-20 parts by mass, more preferably 2-20 parts by mass, and most preferably 5-20 parts by mass, calculated as $SiO_2$, per 100 parts by mass of cerium in said oxide, calculated as $CeO_2$. If less silicon is added, the reduction rate of the resulting complex oxide tends to decrease, and if more silicon is added, the heat resistance of the resulting complex oxide decreases, and the specific surface area tends to decrease at high temperature.

The impregnation of silicon oxide precursor solution into the cerium oxide in step (e1) can be performed, for example, by the pore filling method, adsorption method, or evaporation to dryness method.

In the pore filling method, the cerium oxide pore volume is measured beforehand, and the same volume of silicon oxide precursor solution is added so that the cerium oxide surface is uniformly wetted.

Method 1 includes step (f1), where the cerium oxide that has been impregnated with silicon oxide precursor solution is fired. The firing temperature is usually 300-700° C., preferably 350-600° C.

The firing time in step (f1) can be appropriately set depending on the firing temperature, and is usually 1-10 hours.

In method 1, step (f1) is performed after abovementioned step (e1); the cerium oxide that has been impregnated with silicon oxide precursor solution can also be subjected to a step comprising drying at around 60-200° C. Performing such a drying step allows the firing in step (f1) to proceed with good efficiency.

Method 1 includes step (g), where the resulting fired substance is reduced. The reduction in step (g) can be performed, for example, in a reducing atmosphere comprising hydrogen, deuterium, carbon monoxide or the like individually, or mixtures thereof; or in an inert atmosphere comprising nitrogen, helium, argon or the like individually, or mixtures thereof; or in a vacuum. The temperature during reduction is usually 100-600° C., preferably 150-500° C. The reduction time is usually 0.5-5 hours, preferably 1-3 hours.

Method 1 includes step (h), where the resulting reduced substance is oxidized. In step (h), the oxidation can be performed in air, usually at 100-900° C., preferably 200-800° C. The oxidation time is usually 0.1-3 hours, preferably 0.3-2 hours. In method 1, step (h) can yield the inventive complex oxide having the abovementioned physical properties.

Method 2 of the inventive production method includes step (a1) and step (b1), performed as in abovementioned method 1, followed by step (a2), where specified rare earth metal element oxide precursor (namely, precursor of oxide of rare earth metal element other than cerium, including yttrium) is added to the cerium suspension obtained by maintained heating in step (b1).

The specified rare earth metal element oxide precursor should be a compound that yields the specified rare earth metal element oxide as a result of oxidation treatment such as firing; for example, a specified rare earth metal element-containing nitrate solution.

The amount of specified rare earth metal element oxide precursor added can be adjusted so that the mass ratio of cerium in said cerium suspension to specified rare earth metal element in the specified rare earth metal element oxide precursor is usually 85:15-99:1, preferably 85:15-95:5, calculated as oxides. If the proportion of cerium in the oxide of cerium and specified rare earth metal element, calculated as $CeO_2$, is below 85% by mass, there is a risk of decrease in the heat resistance and reduction rate of the resulting complex oxide.

Step (a2) may be performed after the cerium suspension obtained by maintained heating in step (b1) has cooled. The cooling is usually performed with agitation, and a commonly known method can be used. Natural slow cooling or forced cooling using a condenser may be employed. The cooling temperature is usually no higher than 40° C., and is preferably room temperature of around 20-30° C.

In step (a2), the cerium suspension salt concentration may be adjusted by removing the mother liquor from the cerium suspension, or by adding water, before said specified rare earth metal element oxide precursor is added. For example, the mother liquor can be removed by the decantation method, Nutsche method, centrifugal separation method, or filter press method; in such cases a certain amount of cerium is removed with the mother liquor, but the amount of specified rare earth metal element oxide precursor and water subsequently added can be adjusted in view of the amount of cerium removed.

Method 2 includes step (b2), where cerium suspension containing said specified rare earth metal element oxide precursor is heated to and maintained at no lower than 100° C., preferably 100-200° C., particularly preferably 100-150° C. In step (b2), the maintained heating time is usually 10 minutes-6 hours, preferably 20 minutes-5 hours, more preferably 30 minutes-4 hours.

If the maintained heating in step (b2) is at below 100° C., the precipitate (described later) is not crystalline, and there is a risk that it will not be possible to sufficiently improve the heat resistance and reduction rate of the complex oxide finally obtained. Too long a maintained heating time has little effect on the heat resistance or reduction rate, and is not industrially advantageous.

Method 1 includes step (c2), where precipitate is obtained by adding precipitant to the suspension obtained in step (b2). Sodium hydroxide, potassium hydroxide, ammonia water, ammonia gas, and bases that are mixtures thereof are examples of precipitants that can be used in step (c2); use of ammonia water is particularly preferred.

Said precipitant can be added, for example, by preparing the precipitant as an aqueous solution of suitable concentration, and adding said solution, with agitation, to the suspension obtained in step (c2); ammonia gas can be introduced by blowing it into the reaction vessel with agitation. The amount of precipitant to add can easily be determined by monitoring the variation in the pH of the suspension. It is usually sufficient to add an amount that produces precipitate of suspension of around pH 7-9, preferably pH 7-8.5.

Step (c2) may be performed after the cerium suspension obtained as a result of the maintained heating in step (b2) has cooled.

The cooling is usually performed with agitation, and a commonly known method can be used. Natural slow cooling or forced cooling using a condenser may be employed. The cooling temperature is usually no higher than 40° C., and is preferably room temperature of around 20-30° C.

The precipitation reaction in step (c2) yields a slurry containing cerium oxide hydrate precipitate in which there is advanced crystal growth. Said precipitate can be separated by the Nutsche method, centrifugal separation method, or filter press method, for example. The precipitate can also be rinsed with water if necessary. Also, a step whereby the resulting precipitate is appropriately dried may be included, in order to increase the efficiency of the next step, step (f).

Method 2 includes step (d2), where the abovementioned precipitate is calcined. The calcination temperature is usually 250-500° C., preferably 280-450° C. The calcination time is usually 30 minutes-36 hours, particularly preferably 1-24 hours, and more preferably 3-20 hours.

The oxide obtained by calcination in step (d2) is a porous body that retains pores of sufficient volume to allow impregnation with silicon oxide precursor solution, described below; this step facilitates impregnation with silicon oxide precursor solution, and improves the heat resistance and reduction rate of the final complex oxide.

Method 2 includes step (e2), where the oxide obtained by abovementioned calcination is impregnated with silicon oxide precursor solution.

The silicon oxide precursor used in step (e2) is a compound that yields silicon oxide as a result of oxidation treatment such as firing; it should be a compound that allows impregnation of the calcined oxide porous body using solution, and examples include silicates such as sodium silicate, silane compounds such as tetraethyl orthosilicate, silyl compounds such as trimethylsilyl isocyanate, and silicic acid quaternary ammonium salts such as tetramethylammonium silicate.

Solvents for dissolving silicon oxide precursors can be classified according to the type of precursor used. Examples include water, and organic solvents such as alcohol, xylene, hexane and toluene.

There are no particular limitations on the concentration of the silicon oxide precursor solution, provided that the solution can impregnate said porous body oxide; for workability and efficiency, the silicon oxide precursor concentration, calculated as $SiO_2$, is usually 1-300 g/L, preferably around 10-200 g/L.

In step (e2), the amount of said silicon oxide precursor added is usually more than 0 parts by mass but no more than 20 parts by mass, preferably 1-20 parts by mass, more preferably 2-20 parts by mass, and most preferably 5-20 parts by mass, calculated as $SiO_2$, per total 100 parts by mass of the cerium and specified rare earth metal elements in said oxide, calculated as the oxides. If less silicon is added, the heat resistance and reduction rate of the resulting complex oxide tend to decrease, and if too much silicon is added, the heat resistance of the resulting complex oxide decreases, and the specific surface area tends to decrease at high temperature.

The impregnation of silicon oxide precursor solution into said oxide in step (e2) can be performed, for example, by the pore filling method, adsorption method, or evaporation to dryness method.

In the pore filling method, the pore volume of said oxide is measured beforehand, and the same volume of silicon oxide precursor solution is added so that the cerium oxide surface is uniformly wetted.

Method 2 includes step (f2), where the oxide that has been impregnated with silicon oxide precursor solution is fired. The firing temperature is usually 300-700° C., preferably 350-600° C.

The firing time in step (f2) can be appropriately set depending on the firing temperature, and is usually 1-10 hours.

In method 2, step (f2) is performed after abovementioned step (e2); the oxide that has been impregnated with silicon oxide precursor can also be subjected to a step comprising drying at around 60-200° C. Performing such a drying step allows the firing in step (f2) to proceed with good efficiency.

In method 2, the inventive complex oxide can be obtained by performing step (g) and step (h) as in method 1, after step (f2).

Inventive method 3 includes step (A1), where cerium solution in which at least 90 mol % of the cerium ions are tetravalent is prepared.

Ceric nitrate and eerie ammonium nitrate are examples of water-soluble cerium compounds that can be used in step (A1); use of eerie nitrate solution is particularly preferred.

In step (A1), the initial concentration of the cerium solution in which at least 90 mol % of the cerium ions are tetravalent can usually be adjusted to 5-100 g/L, preferably 5-80 g/L, and particularly preferably 10-70 g/L of cerium, calculated as $CeO_2$. To adjust the concentration of the cerium solution, water is usually used, and deionized water is particularly preferred. If said initial concentration is too high, the precipitate (described later) is not crystalline, pores of sufficient volume cannot form, and there is a risk of decrease in the heat resistance and reduction rate of the complex oxide finally obtained. If the concentration is too low, productivity decreases, which is industrially disadvantageous.

In method 3, the cerium solution prepared in step (A1) is then subjected to step (B1), where it is heated to and maintained at no lower than 60° C.

The reaction vessel used in step (B1) may be a sealed container or open container, and it is preferable to use an autoclave reaction vessel.

The temperature of the maintained heating in step (B1) is no lower than 60° C., preferably 60-200° C., particularly preferably 80-180° C., and more preferably 90-160° C. The maintained heating time is usually 10 minutes-48 hours, preferably 30 minutes-36 hours, more preferably 1 hour-24 hours. If there is insufficient maintained heating, the precipitate (described later) is not crystalline, pores of sufficient volume cannot form, and there is a risk that it will not be possible to sufficiently improve the heat resistance and reduction rate of the complex oxide finally obtained. Too long a maintained heating time has little effect on the heat resistance or reduction rate, and is not industrially advantageous.

Method 3 includes step (C1), where silicon oxide precursor is added to the cerium suspension obtained in abovementioned step (B1).

In step (C1), the silicon oxide precursor added to the cerium suspension should be a compound that can yield silicon oxide as a result of oxidation treatment such as firing; examples include colloidal silica, siliconate and quaternary ammonium silicate sol, and the use of colloidal silica is particularly preferred in view of lowering production costs and the environmental load.

In step (C1), the amount of said silicon oxide precursor added is usually more than 0 parts by mass but no more than 20 parts by mass, preferably 1-20 parts by mass, more preferably 2-20 parts by mass, and most preferably 5-20 parts by mass, calculated as $SiO_2$, per 100 parts by mass of cerium in said oxide, calculated as $CeO_2$. If less silicon is added, the reduction rate of the resulting complex oxide tends to decrease, and if more silicon is added, the heat resistance of the resulting complex oxide decreases, and the specific surface area tends to decrease at high temperature. In step (C1), the cerium suspension salt concentration may be adjusted by removing the mother liquor from the cerium suspension, or adding water, before said silicon oxide precursor is added. For example, the mother liquor can be removed by the decantation method, Nutsche method, centrifugal separation method, or filter press method; in such cases a certain amount of cerium is removed with the mother liquor, but the amount of silicon oxide precursor and water subsequently added can be adjusted in view of the amount of cerium removed.

Step (C1) may be performed after the cerium suspension obtained as a result of the maintained heating in step (B1) has cooled. The cooling is usually performed with agitation, and a commonly known method can be used. Natural slow cooling or forced cooling using a condenser may be employed. The cooling temperature is usually no higher than 40° C., and is preferably room temperature of around 20-30° C.

Method 3 includes step (D1), where the cerium suspension containing said silicon oxide precursor is heated to and maintained at no lower than 100° C., preferably 100-200° C., particularly preferably 100-150° C.

In step (D1), the maintained heating time is usually 10 minutes-6 hours, preferably 20 minutes-5 hours, more preferably 30 minutes-4 hours.

If the maintained heating in step (D1) is at below 100° C., the precipitate (described later) is not crystalline, and there is a risk that it will not be possible to sufficiently improve the heat resistance and reduction rate of the complex oxide finally obtained. Too long a maintained heating time has little effect on the heat resistance or reduction rate, and is not industrially advantageous.

Method 3 includes step (E1), where precipitant is added to the cerium suspension containing silicon oxide precursor subjected to maintained heating, to obtain precipitate.

Sodium hydroxide, potassium hydroxide, ammonia water, ammonia gas, and bases that are mixtures thereof are examples of precipitants that can be used in step (E1); use of ammonia water is particularly preferred. The amount of precipitant to add in step (E) can easily be determined by monitoring the pH variation in the silicon oxide precursor-containing cerium suspension that was subjected to maintained heating. It is usually sufficient to add an amount that produces precipitate of cerium suspension of around pH 7-9, preferably pH 7-8.5.

Step (E1) may be performed after the cerium suspension obtained as a result of the maintained heating in step (D1) has cooled. The cooling is usually performed with agitation, and a commonly known method can be used. Natural slow cooling or forced cooling using a condenser may be employed. The cooling temperature is usually no higher than 40° C., and is preferably room temperature of around 20-30° C.

Said precipitate can be separated by the Nutsche method, centrifugal separation method, or filter press method, for example. The precipitate can also be rinsed with water if necessary.

Method 3 includes step (F), where the resulting precipitate is fired. The firing temperature is usually 300-700° C., preferably 350-600° C.

Abovementioned step (F) can yield complex oxide of cerium that contains silicon and has excellent heat resistance and reduction rate.

The firing time is usually 1-48 hours, particularly preferably 1-24 hours, and more preferably 3-20 hours.

Method 3 includes step (G), where the resulting fired substance is reduced. The reduction in step (G) can be performed, for example, in a reducing atmosphere comprising hydrogen, deuterium, carbon monoxide or the like individually, or mixtures thereof; or in an inert atmosphere comprising nitrogen, helium, argon or the like individually, or mixtures thereof; or in a vacuum. The temperature during reduction is usually 100-600° C., preferably 150-500° C. The reduction time is usually 0.5-5 hours, preferably 1-3 hours.

Method 3 includes step (H), where the resulting reduced substance is oxidized. In step (H), the oxidation can be performed in air, usually at 100-900° C., preferably 200-800° C. The oxidation time is usually 0.1-3 hours, preferably 0.3-2 hours. In method 3, step (H) can yield the inventive complex oxide having the abovementioned physical properties.

Method 4 of the inventive production method includes step (A1) and step (B1), performed as in abovementioned method 3, followed by step (A2), where a silicon oxide precursor and specified rare earth metal element oxide precursor are added to the cerium suspension obtained in step (B1).

In step (A2), the silicon oxide precursor added to the cerium suspension should be a compound that can yield silicon oxide as a result of oxidation treatment such as firing; examples include colloidal silica, siliconate and quaternary ammonium silicate sol, and the use of colloidal silica is preferred in view of lowering production costs and the environmental load In step (A2), the amount of said silicon oxide precursor added is usually more than 0 parts by mass but no more than 20 parts by mass, preferably 1-20 parts by mass, more preferably 2-20 parts by mass, and most preferably 5-20 parts by mass, calculated as $SiO_2$, per total 100 parts by mass of cerium and specified rare earth metal elements in the final complex oxide, calculated as oxides. If less silicon is added, the heat resistance and reduction rate of the resulting complex oxide tend to decrease, and even if an excess amount of silicon is added, the heat resistance of the resulting complex oxide decreases, and the specific surface area tends to decrease at high temperature.

In step (A2), the specified rare earth metal oxide precursor should be a compound that yields the specified rare earth metal element oxide as a result of oxidation treatment such as firing; for example, a specified rare earth metal element-containing nitrate solution.

The amount of specified rare earth metal element oxide precursor added can be adjusted so that the mass ratio of cerium in said cerium suspension to specified rare earth metal element in the specified rare earth metal element oxide precursor is usually 85:15-99:1, preferably 85:15-95:5, calculated as oxides. If the proportion of cerium in the oxide of cerium and specified rare earth metal element, calculated as $CeO_2$, is below 85% by mass, or above 99% by mass, there is a risk of decrease in the heat resistance and reduction rate.

Step (A2) may be performed after the cerium suspension obtained by maintained heating in step (B1) has cooled. The cooling is usually performed with agitation, and a commonly known method can be used. Natural slow cooling or forced cooling using a condenser may be employed. The cooling temperature is usually no higher than 40° C., and is preferably room temperature of around 20-30° C.

In step (A2), the cerium suspension salt concentration may be adjusted by removing the mother liquor from the cerium suspension, or by adding water, before said silicon oxide precursor and said specified rare earth metal element oxide precursor are added. For example, the mother liquor can be removed by the decantation method, Nutsche method, centrifugal separation method, or filter press method; in such cases a certain amount of cerium is removed with the mother liquor, but the amount of silicon oxide precursor, specified rare earth metal element oxide precursor and water subsequently added can be adjusted in view of the amount of cerium removed.

Method 4 includes step (B2), where the cerium suspension containing said silicon oxide precursor and specified rare earth metal element oxide precursor is heated to and maintained at no lower than 100° C., preferably 100-200° C., particularly preferably 100-150° C.

In step (B2), the maintained heating time is usually 10 minutes-6 hours, preferably 20 minutes-5 hours, more preferably 30 minutes-4 hours.

If the maintained heating in step (B2) is at below 100° C., the precipitate (described later) is not crystalline, and there is a risk that it will not be possible to sufficiently improve the heat resistance and reduction rate of the complex oxide finally obtained. Too long a maintained heating time has little effect on the heat resistance or reduction rate, and is not industrially advantageous.

Method 4 includes step (E2), where precipitate is obtained by adding precipitant to the suspension obtained in step (B2).

Sodium hydroxide, potassium hydroxide, ammonia water, ammonia gas, and bases that are mixtures thereof are examples of precipitants that can be used in step (E2); use of ammonia water is particularly preferred. The amount of precipitant to add in step (E) can easily be determined by monitoring the pH variation in the suspension. It is usually sufficient to add an amount that produces precipitate of suspension of around pH 7-9, preferably pH 7-8.5.

Step (E2) may be performed after the cerium suspension obtained as a result of the maintained heating in step (B2) has cooled. The cooling is usually performed with agitation, and a commonly known method can be used. Natural slow cooling or forced cooling using a condenser may be employed. The cooling temperature is usually no higher than 40° C., and is preferably room temperature of around 20-30° C.

Said precipitate can be separated by the Nutsche method, centrifugal separation method, or filter press method, for example. The precipitate can also be rinsed with water if necessary.

In method 4, step (F), step (G) and step (H) are performed as in method 3, to yield inventive complex oxide having the abovementioned physical properties.

Complex oxide obtained in step (h) or step (H) can be pulverized and used as powder in the inventive production method. Said pulverization can be achieved using a commonly used pulverizer such as a hammer mill, to obtain powder of the desired particle size.

The powder of complex oxide obtained according to the inventive production method can be obtained at the desired particle size by said pulverization; for example, when it is to be used as an auxiliary catalyst for an exhaust gas purification catalyst, the mean particle size is preferably 1-50 μm.

There are no particular limitations on the inventive exhaust gas purification catalyst provided that it is provided with auxiliary catalyst containing the inventive complex oxide; its production and other materials etc. can be those commonly used, for example.

EXAMPLES

The present invention is described in more detail below by means of examples and comparative examples, but the present invention is not limited to these.

Example 1

This example relates to a complex oxide in which 1 part by mass of silicon oxide has been added per 100 parts by mass of cerium oxide.

A 20 g portion, calculated as $CeO_2$, of ceric nitrate solution in which at least 90 mol % of the cerium ions were tetravalent was taken, and pure water was then added to adjust the total volume to 1 L. The resulting solution was then introduced into an autoclave reaction vessel and heated to 120° C., kept at that temperature for 6 hours, then allowed to cool naturally to room temperature.

Next, ammonia water was added to neutralize the system to pH 8, to obtain cerium oxide hydrate slurry. Said slurry was subjected to solid-liquid separation by Nutsche filtration, to obtain a filter cake. Said filter cake was fired in air, in a box-shaped electrical furnace, at 300° C. for 10 hours, to obtain cerium oxide.

Next, 15.8 g of the resulting cerium oxide were introduced into a beaker, and solution obtained by dissolving 0.520 g tetraethyl orthosilicate (containing 0.155 g calculated as $SiO_2$) in ethanol to a total volume of 10 mL was added to said cerium oxide to impregnate it with silicon oxide precursor solution, by the pore filling method.

The cerium oxide impregnated with silicon oxide precursor solution was then dried at 120° C. for 10 hours, and then fired in air at 500° C. for 10 hours.

The resulting fired substance was subjected to reduction treatment by being held in a 90% argon-10% hydrogen atmosphere at 250° C. for 2 hours. It was then fired in air at 500° C. for 0.5 hours to obtain complex oxide powder that was mainly cerium oxide and contained 1 part by mass of silicon oxide per 100 parts by mass of cerium oxide.

0.5 g of the resulting complex oxide powder was thermally reduced in a 90% argon-10% hydrogen atmosphere, gas flow rate 30 mL/min, from 50° C. to 900° C. with the temperature increasing at a rate of 10° C./min. It was then fired at 500° C. for 0.5 hours in air. The 50° C. to 900° C. temperature-programmed reduction (TPR) measurements were obtained using an automatic temperature-programmed desorption analyzer (TP-5000) manufactured by (K.K.) Okura Riken, and the cerium oxide reduction rate at and below 400° C. was calculated from the results. The results are shown in Table 1.

Also, after having been fired in air at 500° C. for 0.5 hours, it was thermally reduced in a 90% argon-10% hydrogen atmosphere, gas flow rate 30 mL/min, from 50° C. to 900° C. with the temperature increasing at a rate of 10° C./min. It was then fired at 500° C. for 0.5 hours in air, and the specific surface area was measured by the BET method. The results are shown in Table 1.

Example 2

This example relates to a complex oxide in which 2 parts by mass of silicon oxide have been added per 100 parts by mass of cerium oxide.

Complex oxide powder that was mainly cerium oxide and contained 2 parts by mass of silicon oxide per 100 parts by mass of cerium oxide was obtained as in Example 1, except that the amount of tetraethyl orthosilicate added was 1.04 g (containing 0.31 g calculated as $SiO_2$). The physical properties of the resulting complex oxide powder were evaluated by the same methods as in Example 1. The results are shown in Table 1.

Example 3

This example relates to a complex oxide in which 5.3 parts by mass of silicon oxide have been added per 100 parts by mass of cerium oxide.
Complex oxide powder that was mainly cerium oxide and contained 5.3 parts by mass of silicon oxide per 100 parts by mass of cerium oxide was obtained as in Example 1, except that the amount of tetraethyl orthosilicate added was 2.65 g (containing 0.79 g calculated as $SiO_2$). The physical properties of the resulting complex oxide powder were evaluated by the same methods as in Example 1. The results are shown in Table 1.

Example 4

This example relates to a complex oxide in which 11 parts by mass of silicon oxide have been added per 100 parts by mass of cerium oxide.
Complex oxide powder that was mainly cerium oxide and contained 11 parts by mass of silicon oxide per 100 parts by mass of cerium oxide was obtained as in Example 1, except that the amount of tetraethyl orthosilicate added was 5.60 g (containing 1.67 g calculated as $SiO_2$). The physical properties of the resulting complex oxide powder were evaluated by the same methods as in Example 1. The results are shown in Table 1.

Example 5

This example relates to a complex oxide in which 20 parts by mass of silicon oxide have been added per 100 parts by mass of cerium oxide.
Complex oxide powder that was mainly cerium oxide and contained 20 parts by mass of silicon oxide per 100 parts by mass of cerium oxide was obtained as in Example 1, except that the amount of tetraethyl orthosilicate added was 10.6 g (containing 3.16 g calculated as $SiO_2$). The physical properties of the resulting complex oxide powder were evaluated by the same methods as in Example 1. The results are shown in Table 1.

Example 6

This example relates to a complex oxide in which 11 parts by mass of silicon oxide have been added per 100 parts by mass of cerium oxide, where the complex oxide is prepared by a different method to that in Example 4.
A 20 g portion, calculated as $CeO_2$, of ceric nitrate solution in which at least 90 mol % of the cerium ions were tetravalent was taken, and pure water was then added to adjust the total volume to 1 L. The resulting solution was then heated to 100° C., kept at that temperature for 30 minutes, then allowed to cool naturally to room temperature, to obtain a cerium suspension.
Next, 8.8 g of colloidal silica (2.2 g calculated as $SiO_2$) were added to the resulting suspension, and the resulting system was held at 120° C. for 2 hours, then allowed to cool naturally; ammonia water was then added to neutralize the system to pH 8.5. The resulting neutralized slurry was subjected to solid-liquid separation by Nutsche filtration, to obtain a filter cake; said cake was fired in air at 500° C. for 10 hours. The resulting fired substance was subjected to reduction treatment by being held in a 90% argon-10% hydrogen atmosphere at 250° C. for 2 hours. It was then fired in air at 500° C. for 0.5 hours to obtain complex oxide powder that was mainly cerium oxide and contained 11 parts by mass of silicon oxide per 100 parts by mass of cerium oxide.
The physical properties of the resulting complex oxide powder were evaluated by the same methods as in Example 1. The results are shown in Table 1.

Comparative Example 1

This example relates to cerium oxide that does not contain silicon oxide.
A 20 g portion, calculated as $CeO_2$, of ceric nitrate solution in which at least 90 mol % of the cerium ions were tetravalent was taken, and pure water was then added to adjust the total volume to 1 L. The resulting solution was introduced into an autoclave reaction vessel and heated to 120° C., kept at that temperature for 6 hours, then allowed to cool naturally to room temperature.
Next, ammonia water was added to neutralize the system to pH 8, to obtain cerium oxide hydrate slurry. Said slurry was subjected to solid-liquid separation by Nutsche filtration, to obtain a filter cake. Said filter cake was fired in air, in a box-shaped electrical furnace, at 500° C. for 10 hours, to obtain a fired substance.
The resulting fired substance was subjected to reduction treatment by being held in a 90% argon-10% hydrogen atmosphere at 250° C. for 2 hours. It was then fired in air at 500° C. for 0.5 hours to obtain cerium oxide powder.
The physical properties of the resulting cerium oxide powder were evaluated by the same methods as in Example 1. The results are shown in Table 1.

Comparative Example 2

This example relates to a complex oxide in which 6.8 parts by mass of silicon oxide have been added per 100 parts by mass of cerium oxide, where the complex oxide is synthesized according to the method disclosed in *Journal of Catalysis* 194, 461-478 (2000).
Specifically, aqueous solution comprising 7.69 g of sodium silicate (3.42 g calculated as $SiO_2$) and aqueous solution comprising 108.24 g of cerium chloride (50.0 g calculated as $CeO_2$) were mixed to obtain 2.23 L of mixed aqueous solution.
Next, the mixed aqueous solution was heat-treated at 90° C. for 24 hours in a reactor, to obtain a yellow slurry. Ammonia water was added to said slurry to adjust the pH to 11.5, and the resulting system was subjected to solid-liquid separation by Nutsche filtration to obtain a filter cake, which was then washed using pure water and acetone. Said washed cake was dried at 60° C. for 24 hours, then fired in air, in a box-shaped electrical furnace, at 500° C. for 10 hours, to obtain complex oxide powder that was mainly cerium oxide and contained 6.8 parts by mass of silicon oxide per 100 parts by mass of cerium oxide.
The physical properties of the resulting complex oxide powder were evaluated by the same methods as in Example 1. The results are shown in Table 1.

TABLE 1

| | Oxide composition other than oxygen | Proportion of Si | Production method | CeO$_2$ reduction rate at and below 400° C. | BET (m$^2$/g) |
|---|---|---|---|---|---|
| Example 1 | Ce + Si | 1.0 | Method 1 | 2.1% | 21 |
| Example 2 | Ce + Si | 2.0 | Method 1 | 2.4% | 28 |
| Example 3 | Ce + Si | 5.3 | Method 1 | 2.5% | 33 |
| Example 4 | Ce + Si | 11 | Method 1 | 2.5% | 22 |
| Example 5 | Ce + Si | 20 | Method 1 | 2.2% | 20 |
| Example 6 | Ce + Si | 11 | Method 3 | 2.8% | 28 |
| Comparative example 1 | Ce | 0 | — | 0.7% | 14 |
| Comparative example 2 | Ce + Si | 6.8 | — | 0.5% | 16 |

Note:
The proportion of Si is the parts by mass of Si calculated as SiO$_2$, per 100 parts by mass of Ce calculated as CeO$_2$.

Example 7

This example relates to a complex oxide in which 1 part by mass of silicon oxide has been added per total 100 parts by mass of cerium oxide, lanthanum oxide and praseodymium oxide in the proportion 90:5:5 by mass.

A 50 g portion, calculated as CeO$_2$, of ceric nitrate solution in which at least 90 mol % of the cerium ions were tetravalent was taken, and pure water was then added to adjust the total volume to 1 L. The resulting solution was then heated to 100° C., kept at that temperature for 30 minutes, then allowed to cool naturally to room temperature to obtain a cerium suspension.

The mother liquor was removed from the resulting cerium suspension, and then 10.4 ml of lanthanum nitrate solution (containing 2.6 g calculated as La$_2$O$_3$), 10.3 ml of praseodymium nitrate solution (containing 2.6 g calculated as Pr$_6$O$_{11}$), and 2.5 g of colloidal silica (0.5 g calculated as SiO$_2$) were added and the total volume was adjusted to 1 L using pure water.

Next, the cerium suspension containing lanthanum oxide, praseodymium oxide and silicon oxide precursors was kept at 120° C. for 2 hours and then allowed to cool naturally, and ammonia water was added to the resulting system to neutralize it to pH 8.5.

The resulting slurry was subjected to solid-liquid separation by Nutsche filtration to obtain a filter cake. Said cake was fired in air at 500° C. for 10 hours. The resulting fired substance was subjected to reduction treatment by being held in a 90% argon -10% hydrogen atmosphere at 250° C. for 2 hours. It was then fired in air at 500° C. for 0.5 hours to obtain complex oxide powder that was mainly cerium oxide and contained 1 part by mass of silicon oxide per 100 parts by mass of cerium oxide, lanthanum oxide and praseodymium oxide, in which the cerium oxide, lanthanum oxide, praseodymium oxide mass ratio was 90:5:5.

The physical properties of the resulting complex oxide powder were evaluated by the same methods as in Example 1. The results are shown in Table 2.

Example 8

This example relates to a complex oxide in which 2 parts by mass of silicon oxide have been added per total 100 parts by mass of cerium oxide, lanthanum oxide and praseodymium oxide in the proportion 90:5:5 by mass.

Complex oxide powder that was mainly cerium oxide and contained 2 parts by mass of silicon oxide per 100 parts by mass of cerium oxide, lanthanum oxide and praseodymium oxide, in which the cerium oxide, lanthanum oxide, praseodymium oxide mass ratio was 90:5:5, was obtained as in Example 7, except that the amount of colloidal silica added was 4.9 g (containing 1.0 g calculated as SiO$_2$). The physical properties of the resulting complex oxide powder were evaluated by the same methods as in Example 1. The results are shown in Table 2.

Example 9

This example relates to a complex oxide in which 5 parts by mass of silicon oxide have been added per total 100 parts by mass of cerium oxide, lanthanum oxide and praseodymium oxide in the proportion 90:5:5 by mass.

Complex oxide powder that was mainly cerium oxide and contained 5 parts by mass of silicon oxide per 100 parts by mass of cerium oxide, lanthanum oxide and praseodymium oxide, in which the cerium oxide, lanthanum oxide, praseodymium oxide mass ratio was 90:5:5, was obtained as in Example 7, except that the amount of colloidal silica added was 12.7 g (containing 2.6 g calculated as SiO$_2$). The physical properties of the resulting complex oxide powder were evaluated by the same methods as in Example 1. The results are shown in Table 2.

Example 10

This example relates to a complex oxide in which 10 parts by mass of silicon oxide have been added per total 100 parts by mass of cerium oxide, lanthanum oxide and praseodymium oxide in the proportion 90:5:5 by mass.

Complex oxide powder that was mainly cerium oxide and contained 10 parts by mass of silicon oxide per 100 parts by mass of cerium oxide, lanthanum oxide and praseodymium oxide, in which the cerium oxide, lanthanum oxide, praseodymium oxide mass ratio was 90:5:5, was obtained as in Example 7, except that the amount of colloidal silica added was 25.4 g (containing 5.2 g calculated as SiO$_2$). The physical properties of the resulting complex oxide powder were evaluated by the same methods as in Example 1. The results are shown in Table 2.

Example 11

This example relates to a complex oxide in which 20 parts by mass of silicon oxide have been added per total 100 parts by mass of cerium oxide, lanthanum oxide and praseodymium oxide in the proportion 90:5:5 by mass.

Complex oxide powder that was mainly cerium oxide and contained 20 parts by mass of silicon oxide per 100 parts by mass of cerium oxide, lanthanum oxide and praseodymium oxide, in which the cerium oxide, lanthanum oxide, praseodymium oxide mass ratio was 90:5:5, was obtained as in Example 7, except that the amount of colloidal silica added was 50.8 g (containing 10.4 g calculated as SiO$_2$). The physical properties of the resulting complex oxide powder were evaluated by the same methods as in Example 1. The results are shown in Table 2.

Example 12

This example relates to a complex oxide in which 5 parts by mass of silicon oxide have been added per total 100 parts by mass of cerium oxide, lanthanum oxide and praseodymium oxide in the proportion 90:5:5 by mass, where the complex oxide is prepared by a different method to that in Example 9.

A 50 g portion, calculated as $CeO_2$, of ceric nitrate solution in which at least 90 mol % of the cerium ions were tetravalent was taken, and pure water was then added to adjust the total volume to 1 L. The resulting solution was heated to 100° C., kept at that temperature for 30 minutes, and then allowed to cool naturally to room temperature, to obtain a cerium suspension.

Next, the mother liquor was removed from the resulting cerium suspension, and then 10.4 ml of lanthanum nitrate solution (containing 2.6 g calculated as $La_2O_3$) and 10.3 ml of praseodymium nitrate solution (containing 2.6 g calculated as $Pr_6O_{11}$) were added, and the total volume was adjusted to 1 L using pure water.

Next, the cerium suspension containing lanthanum oxide and praseodymium oxide precursors was kept at 120° C. for 2 hours and then allowed to cool naturally, and ammonia water was added to the resulting system to neutralize it to pH 8.5.

The resulting slurry was subjected to solid-liquid separation by Nutsche filtration to obtain a filter cake. Said cake was fired in air at 300° C. for 10 hours to obtain rare earth complex oxide that was mainly cerium oxide and contained lanthanum oxide and praseodymium oxide, both at a mass ratio of 5%.

Next, 16.1 g of the resulting rare earth complex oxide were introduced into a beaker, and solution obtained by dissolving 2.60 g tetraethyl orthosilicate (containing 0.75 g calculated as $SiO_2$) in ethanol to a total volume of 9 mL was added to said complex oxide to impregnate it with silicon oxide precursor solution by the pore filling method.

The rare earth complex oxide impregnated with silicon oxide precursor solution was then dried at 120° C. for 10 hours, then fired in air at 500° C. for 10 hours. The resulting fired substance was subjected to reduction treatment by being held in a 90% argon -10% hydrogen atmosphere at 250° C. for 2 hours. It was then fired in air at 500° C. for 0.5 hours to obtain complex oxide powder that was mainly cerium oxide and contained 5 parts by mass of silicon oxide per 100 parts by mass of cerium oxide, lanthanum oxide and praseodymium oxide in which the cerium oxide, lanthanum oxide, praseodymium oxide mass ratio was 90:5:5. The physical properties of the resulting complex oxide powder were evaluated by the same methods as in Example 1. The results are shown in Table 2.

Example 13

This example relates to a complex oxide in which 5 parts by mass of silicon oxide have been added per total 100 parts by mass of cerium oxide and lanthanum oxide in the proportion 90:10 by mass.

Complex oxide powder that was mainly cerium oxide and contained 5 parts by mass of silicon oxide per 100 parts by mass of cerium oxide and lanthanum oxide, in which the cerium oxide and lanthanum oxide mass ratio was 90:10, was obtained as in Example 12, except instead of adding lanthanum nitrate solution and praseodymium nitrate solution, 20.8 ml lanthanum nitrate solution (containing 5.2 g calculated as $La_2O_3$) only was added. The physical properties of the resulting complex oxide powder were evaluated by the same methods as in Example 1. The results are shown in Table 2.

Example 14

This example relates to a complex oxide in which 5 parts by mass of silicon oxide have been added per total 100 parts by mass of cerium oxide and praseodymium oxide in the proportion 90:10 by mass.

Complex oxide powder that was mainly cerium oxide and contained 5 parts by mass of silicon oxide per 100 parts by mass of cerium oxide and praseodymium oxide, in which the cerium oxide and praseodymium oxide mass ratio was 90:10, was obtained as in Example 12, except that instead of adding lanthanum nitrate solution and praseodymium nitrate solution, 20.5 ml praseodymium nitrate solution (containing 5.2 g calculated as $Pr_6O_{11}$) only was added. The physical properties of the resulting complex oxide powder were evaluated by the same methods as in Example 1. The results are shown in Table 2.

Example 15

This example relates to a complex oxide in which 5 parts by mass of silicon oxide have been added per total 100 parts by mass of cerium oxide and neodymium oxide in the proportion 90:10 by mass.

Complex oxide powder that was mainly cerium oxide and contained 5 parts by mass of silicon oxide per 100 parts by mass of cerium oxide and neodymium oxide, in which the cerium oxide and neodymium oxide mass ratio was 90:10, was obtained as in Example 12, except that instead of adding lanthanum nitrate solution and praseodymium nitrate solution, 23.5 ml neodymium nitrate solution (containing 5.2 g calculated as $Nd_2O_3$) only was added. The physical properties of the resulting complex oxide powder were evaluated by the same methods as in Example 1. The results are shown in Table 2.

Example 16

This example relates to a complex oxide in which 5 parts by mass of silicon oxide have been added per total 100 parts by mass of cerium oxide and yttrium oxide in the proportion 90:10 by mass.

Complex oxide powder that was mainly cerium oxide and contained 5 parts by mass of silicon oxide per 100 parts by mass of cerium oxide and yttrium oxide, in which the cerium oxide and yttrium oxide mass ratio was 90:10, was obtained as in Example 12, except that instead of adding lanthanum nitrate solution and praseodymium nitrate solution, 22.9 ml yttrium nitrate solution (containing 5.2 g calculated as $Y_2O_3$) only was added. The physical properties of the resulting complex oxide powder were evaluated by the same methods as in Example 1. The results are shown in Table 2.

Comparative Example 3

This example relates to a complex oxide containing no silicon oxide.

A 50 g portion, calculated as $CeO_2$, of ceric nitrate solution in which at least 90 mol % of the cerium ions were tetravalent was taken, and pure water was then added to adjust the total volume to 1 L. The resulting solution was then heated to 100° C., kept at that temperature for 30 minutes, and then allowed to cool naturally to room temperature, to obtain a cerium suspension.

Next, the mother liquor was removed from the resulting cerium suspension, and then 10.4 ml of lanthanum nitrate solution (containing 2.6 g calculated as $La_2O_3$) and 10.3 ml of praseodymium nitrate solution (containing 2.6 g calculated as $Pr_6O_{11}$) were added and the total volume was adjusted to 1 L using pure water.

Next, the cerium suspension containing lanthanum oxide and praseodymium oxide precursors was kept at 120° C. for 2 hours and then allowed to cool naturally, and ammonia water was added to the resulting system to neutralize it to pH 8.5.

The resulting slurry was subjected to solid-liquid separation by Nutsche filtration to obtain a filter cake. Said cake was fired in air at 500° C. for 10 hours to obtain a rare earth complex oxide that was mainly cerium oxide and contained lanthanum oxide and praseodymium oxide, both at a mass ratio of 5%.

The resulting fired substance was subjected to reduction treatment by being held in a 90% argon-10% hydrogen atmosphere at 250° C. for 2 hours. It was then fired in air at 500° C. for 0.5 hours to obtain complex oxide powder that was mainly cerium oxide, and contained cerium oxide, lanthanum oxide and praseodymium oxide in the mass ratio 90:5:5. The physical properties of the resulting complex oxide powder were evaluated by the same methods as in Example 1. The results are shown in Table 2.

TABLE 2

|  | Oxide composition other than oxygen | Proportion of Si | Production method | $CeO_2$ reduction rate at and below 400° C. (%) | BET ($m^2/g$) |
|---|---|---|---|---|---|
| Example 7 | Ce La Pr 90/5/5 + Si | 1.0 | Method 4 | 2.1 | 22 |
| Example 8 | Ce La Pr 90/5/5 + Si | 2.0 | Method 4 | 3.2 | 30 |
| Example 9 | Ce La Pr 90/5/5 + Si | 5.0 | Method 4 | 2.7 | 35 |
| Example 10 | Ce La Pr 90/5/5 + Si | 10 | Method 4 | 2.6 | 30 |
| Example 11 | Ce La Pr 90/5/5 + Si | 20 | Method 4 | 1.9 | 23 |
| Example 12 | Ce La Pr 90/5/5 + Si | 5.0 | Method 2 | 2.0 | 34 |
| Example 13 | Ce La 90/10 + Si | 5.0 | Method 2 | 1.6 | 28 |
| Example 14 | Ce Pr 90/10 + Si | 5.0 | Method 2 | 2.8 | 32 |
| Example 15 | Ce Nd 90/10 + Si | 5.0 | Method 2 | 2.1 | 34 |
| Example 16 | Ce Y 90/10 + Si | 5.0 | Method 2 | 2.5 | 31 |
| Comparative example 3 | Ce La Pr 90/5/5 | 0 | — | 0.9 | 12 |

Note:
The proportion of Si is the parts by mass of Si calculated as $SiO_2$, per total of 100 parts by mass of rare earth metal elements including Ce, calculated as oxides.

Example 17

Complex oxide powder that was mainly cerium oxide and contained 10 parts by mass of silicon oxide per 100 parts by mass of cerium oxide, lanthanum oxide and praseodymium oxide, in which the cerium oxide, lanthanum oxide, praseodymium oxide mass ratio was 90:5:5, was obtained as in Example 10, except that the reduction treatment at 250° C. for 2 hours was changed to a reduction treatment at 150° C. for 2 hours. The physical properties of the resulting complex oxide powder were evaluated by the same methods as in Example 1. The results are shown in Table 3.

Example 18

Complex oxide powder that was mainly cerium oxide and contained 10 parts by mass of silicon oxide per 100 parts by mass of cerium oxide, lanthanum oxide and praseodymium oxide, in which the cerium oxide, lanthanum oxide, praseodymium oxide mass ratio was 90:5:5, was obtained as in Example 10, except that the reduction treatment at 250° C. for 2 hours was changed to a reduction treatment at 500° C. for 2 hours. The physical properties of the resulting complex oxide powder were evaluated by the same methods as in Example 1. The results are shown in Table 3.

Example 19

Complex oxide powder that was mainly cerium oxide and contained 10 parts by mass of silicon oxide per 100 parts by mass of cerium oxide, lanthanum oxide and praseodymium oxide, in which the cerium oxide, lanthanum oxide, praseodymium oxide mass ratio was 90:5:5, was obtained as in Example 10, except that the firing at 500° C. for 0.5 hours (after the reduction treatment at 250° C. for 2 hours) was changed to firing at 200° C. for 0.5 hours. The physical properties of the resulting complex oxide powder were evaluated by the same methods as in Example 1. The results are shown in Table 3.

Example 20

Complex oxide powder that was mainly cerium oxide and contained 10 parts by mass of silicon oxide per 100 parts by mass of cerium oxide, lanthanum oxide and praseodymium oxide, in which the cerium oxide, lanthanum oxide, praseodymium oxide mass ratio was 90:5:5, was obtained as in Example 10, except that the firing at 500° C. for 0.5 hours (after the reduction treatment at 250° C. for 2 hours) was changed to firing at 800° C. for 0.5 hours. The physical properties of the resulting complex oxide powder were evaluated by the same methods as in Example 1. The results are shown in Table 3.

TABLE 3

|  | Reduction treatment temperature (° C.) | Oxidation temperature (after the reduction treatment) (° C.) | $CeO_2$ reduction rate at and below 400° C. (%) | BET ($m^2/g$) |
|---|---|---|---|---|
| Example 17 | 150 | 500 | 2.9% | 30 |
| Example 18 | 500 | 500 | 2.6% | 28 |
| Example 19 | 250 | 200 | 2.8% | 32 |
| Example 20 | 250 | 800 | 2.5% | 29 |

The invention claimed is:

1. A complex oxide comprising:
   cerium oxide;
   an oxide of a rare earth metal element other than cerium, wherein the mass ratio of cerium to rare earth metal elements other than cerium is between 85:15 and 99:1, calculated as oxides; and
   silicon oxide in an amount of more than 0 parts by mass but no more than 20 parts by mass, calculated as $SiO_2$, per total 100 parts by mass of rare earth metal elements including cerium, calculated as oxides;
   wherein the complex oxide has, subsequent to temperature-programmed reduction treatment in a 10% hydrogen-90% argon atmosphere between 50° C. and 900° C. with temperature increasing at 10° C/min, followed by oxidation treatment at 500° C. for 0.5 hours, a calculated reduction rate at and below 400° C. of at least 1.5% as measured by temperature-programmed reduction (TPR) in a 10% hydrogen-90% argon atmosphere between 50° C. and 900° C. with temperature increasing at 10° C/min; and wherein the complex oxide has, subsequent to three repetitions of reduction treatment in a 10% hydrogen-90% argon atmosphere between 50° C. and 900° C. with temperature increasing at 10° C/min, followed by oxidation treatment at 500° C. for 0.5 hours, a specific surface area according to the BET method of at least 20 $m^2/g$.

2. The complex oxide claimed in claim 1, containing 2-20 parts by mass of silicon, calculated as $SiO_2$, per total 100 parts by mass of rare earth metal elements including cerium, calculated as oxides.

3. The complex oxide claimed in claim 1, where said reduction rate at and below 400° C. is at least 2.0%.

4. The complex oxide claimed in claim 1, where said specific surface area according to the BET method is at least 25 $m^2/g$.

5. A method for producing complex oxide of claim 1, the method comprising:
heating a cerium solution wherein at least 90 mol % of cerium ions are tetravalent such that the temperature is maintained above 60° C. to form a cerium suspension;
adding precipitant to the cerium suspension to form a precipitate;
calcining the precipitate to obtain an oxide;
impregnating the oxide with a silicon oxide precursor solution to form an impregnated oxide;
firing the impregnated oxide to form a fired substance;
reducing the fired substance to form a reduced substance; and
oxidizing the reduced substance to form the complex oxide.

6. The method claimed by claim 5, further comprising:
adding at least one precursor of an oxide of a rare earth metal element other than cerium to the cerium suspension; and
heating the cerium suspension containing the precursor of oxide of rare earth metal element other than cerium, such that the temperature is maintained above 100° C.; prior to
adding the precipitant to the cerium suspension.

7. A method for producing complex oxide of claim 1, the method comprising:
heating a cerium solution wherein at least 90 mol % of cerium ions are tetravalent such that the temperature is maintained above 60° C. to form a cerium suspensions:
adding at least one silicon oxide precursor to the cerium suspension;
heating the cerium suspension containing the silicon oxide precursor such that the temperature is maintained above 100° C.;

adding precipitant to the cerium suspension containing silicon oxide precursor to form a precipitate;
firing the precipitate to form a fired substance;
reducing the fired substance to form a reduced substance; and
oxidizing the reduced substance to form the complex oxide.

8. The method claimed by claim 7, further comprising:
heating a cerium solution wherein at least 90 mol % of cerium ions are tetravalent such that the temperature is maintained above 60° C. to form a cerium suspension;
adding at least one precursor of an oxide of a rare earth metal element other than cerium to the cerium suspension;
heating the cerium suspension containing the silicon oxide precursor and the precursor of oxide of rare earth metal element other than cerium, such that the temperature is maintained above 100° C.;
adding precipitant to the heated suspension to form a precipitate;
firing the precipitate to form a fired substance;
reducing the fired substance to form a reduced substance; and
oxidizing the reduced substance to form the complex oxide.

9. The method claimed in claim 5, where the cerium concentration in the cerium solution is 5-100 g/L, calculated as $CeO_2$.

10. The method claimed in claim 5, wherein the reduction is performed at 150-500° C., or wherein the oxidation is performed at 200-800° C., or both.

11. The method claimed in claim 6, wherein the precursor of an oxide of a rare earth metal element other than cerium comprises at least one element selected from yttrium, lanthanum, praseodymium, and neodymium.

12. The method claimed in claim 7, wherein the cerium concentration in the cerium solution is 5-100 g/L, calculated as $CeO_2$.

13. The method claimed in claim 7, wherein the reduction is performed at 150-500° C., or wherein the oxidation is performed at 200-800° C., or both.

14. The method claimed in claim 8, wherein the precursor of an oxide of a rare earth metal element other than cerium comprises at least one element selected from yttrium, lanthanum, praseodymium, and neodymium.

15. The complex oxide claimed in claim 1, wherein the rare earth metal element other than cerium comprises at least one element selected from yttrium, lanthanum, praseodymium, and neodymium.

16. An exhaust gas purification catalyst comprising the complex oxide claimed in claim 1.

17. An exhaust gas purification catalyst comprising the complex oxide claimed in claim 15.

* * * * *